(12) United States Patent
Yamashita et al.

(10) Patent No.: US 9,349,080 B2
(45) Date of Patent: May 24, 2016

(54) PRINTING SYSTEM AND PRINTING CONTROL PROGRAM

(71) Applicant: WingArc1st Inc., Tokyo (JP)

(72) Inventors: Naoto Yamashita, Tokyo (JP); Jun Tanaka, Tokyo (JP)

(73) Assignee: WingArc1st Inc., Tokyo (JP)

( * ) Notice: Subject to any disclaimer, the term of this patent is extended or adjusted under 35 U.S.C. 154(b) by 0 days.

(21) Appl. No.: 14/408,349

(22) PCT Filed: Dec. 13, 2013

(86) PCT No.: PCT/JP2013/083423
§ 371 (c)(1),
(2) Date: Dec. 16, 2014

(87) PCT Pub. No.: WO2014/147907
PCT Pub. Date: Sep. 25, 2014

(65) Prior Publication Data
US 2015/0206038 A1    Jul. 23, 2015

(30) Foreign Application Priority Data

Mar. 21, 2013  (JP) .................................. 2013-057670

(51) Int. Cl.
*G06K 15/02*  (2006.01)
*G06F 3/12*   (2006.01)
*G06K 15/00*  (2006.01)

(52) U.S. Cl.
CPC .......... *G06K 15/1827* (2013.01); *G06F 3/1205* (2013.01); *G06F 3/126* (2013.01); *G06F 3/1208* (2013.01); *G06F 3/1229* (2013.01); *G06F 3/1285* (2013.01); *G06F 3/1293* (2013.01); *G06K 15/1802* (2013.01); *G06K 15/402* (2013.01)

(58) Field of Classification Search
CPC ... G06F 3/1204; G06F 17/214; G06F 3/1255; G06F 3/1285; G06F 3/1257; G06F 3/1205; G06F 3/1208; G06F 3/1229; G06F 3/126; G06F 3/1293; G06K 15/00; G06K 15/02; G06K 15/1827; G06K 15/1802; G06K 2215/0011; G06K 9/18; G06K 15/1809; G06K 15/1828; G06K 1/121; G06K 15/1803; G06K 15/1807
USPC ......................................................... 358/1.11
See application file for complete search history.

(56) References Cited

FOREIGN PATENT DOCUMENTS

| JP | 06-325035 A | 11/1994 |
|---|---|---|
| JP | 07-114545 A | 5/1995 |
| JP | 09-190295 A | 7/1997 |
| JP | 11-058872 A | 3/1999 |
| JP | 2000-172472 A | 6/2000 |
| JP | 2000-272179 A | 10/2000 |

*Primary Examiner* — Iriana Cruz
(74) *Attorney, Agent, or Firm* — Polsinelli PC

(57) ABSTRACT

A host computer (100), wherein the computer is equipped with a font availability determination unit (6) for determining whether or not the font and glyph image specified for characters to be printed are available in a printer (200) and an outline image transmission unit (9) for transmitting an outline image of the specified font to the printer (200) in cases in which it is determined that the font and the like are not available in the printer, and by transmitting the outline image to the printer (200) to print, it is possible to print using a character format which is infinitely close to the font specified by the host computer (100) even in cases in which the specified font and the like are not available in the printer (200).

5 Claims, 5 Drawing Sheets

PRINTING SYSTEM AND PRINTING CONTROL PROGRAM

RELATED APPLICATIONS

This application is a national stage application under 35 U.S.C. §371 of PCT/JP2013/083423, filed Dec. 13, 2013, which claims benefit of Japanese application 2013-057670, filed Mar. 21, 2013. The entire contents of each of these application are hereby incorporated by reference.

TECHNICAL FIELD

The present invention relates to a printing system and a program for printing control and more particularly, is suitably used for a printing system having a host computer and a printer capable of performing bidirectional communication with the host computer.

BACKGROUND ART

Conventionally, there is a printing system in which a host computer and a printer are connected to print a document prepared by the host computer through the printer. The printing system of this type outputs a character code obtained by encoding a character string constituting a document from the host computer to the printer, and designates a font to be used and executes printing.

In recent years, the number of computers mixing and treating characters of languages has gradually been increased with globalization. The computers use Unicode as a character code in many cases. The Unicode has more than one million code points which are suitable for languages in the world. In the case of addition of code representation including a variant character selector (IVS) for identifying variant characters to be characters which have the same meaning and pronunciation as a standard character styles and written differently, the number of character codes possessed by the Unicode is increased further enormously. However, no font covers all character forms of the Unicode having the enormous number of character codes.

In respect of a spool size or printing quality, it is desirable to edit a document by using a font in a host computer in document preparation and to print the document by using a font in a printer in printing. However, the number of types of fonts which can be printed by the printer is generally smaller than that of fonts which can be used in the document preparation of the host computer. In some cases, accordingly, a document prepared by the host computer includes a character having a font of a type which cannot be printed by the printer. In these cases, there is a problem in that a printed document has garbage characters when the host computer designates a font which is not present at the printer side, thereby executing the printing.

On the other hand, there is proposed the technique for enabling printing also in the case in which a font designated by a host computer is not present in a printer (for example, see Patent Documents 1 and 2).

Referring to the technique described in the Patent Document 1, it is decided whether a printer has an in-host font designated for a character to be printed. If the designated in-host font is not present in the printer, a font in the printer is specified as an alternative font. When the alternative font is used, there is calculated a position of each character if the in-host font used and information thus obtained is output to the printer. The printer determines a arrangement position to an image of each font in accordance with the information, thereby guaranteeing a format of a whole document.

Referring to the technique described in the Patent Document 2, moreover, a host computer communicates with a printer to acquire an in-printer font which can be used in the printer. Then, the in-printer font thus acquired is compared with an in-host font which can be used in the host computer and at least a part of the in-host fonts are replaced by optional in-printer fonts and are thus set, and the replaced fonts are also set to the printer. As compared with the case in which data on the in-host font is expanded at the host computer side and a character string is transmitted as image data to the printer side to execute printing, consequently, it is possible to reduce a data volume to be transmitted from the host computer to the printer, thereby increasing a data transfer rate.

Patent Document 1: Japanese Laid-Open Patent Publication No. 1994-325035

Patent Document 2: Japanese Laid-Open Patent Publication No. 2000-172472

DISCLOSURE OF THE INVENTION

Referring to the techniques described in the Patent Documents 1 and 2, however, a font present in a printer is substituted to execute printing if a font designated by a host computer is not present in the printer. Accordingly, the printing is performed in a different font from a font used in document preparation through the host computer by a user. For this reason, there is a problem in that the printing cannot be executed in a font intended by the user.

In order to solve the problem, it is an object of the present invention to enable execution of printing in a character format which is nearly equivalent to a font intended by a user also in the case in which a font designated by a host computer is not present in a printer or the case in which the font does not have a character form (a glyph image) of a character to be printed.

In order to attain the object, in the present invention, the host computer decides whether a font designated for a character to be printed is present in a printer, decides whether a glyph image of the character to be printed is present in the font when the font is present, and transmits a character code representing the character to be printed together with identification information about the designated font to the printer, thereby executing the printing if it is decided that the glyph image is present. On the other hand, if it is decided that the designated font and the glyph image are not present in the printer, the host computer transmits an outline image of the designated font to the printer, thereby executing the printing.

According to the present invention having the structure described above, also in the case in which the font designated by the host computer is not present in the printer or the case in which the font does not have the glyph image of the character to be printed, the outline image possessed by the designated font is transmitted to the printer so that the printing is executed. Consequently, it is possible to execute the printing in a character format which is nearly equivalent to the font designated through the host computer by a user, that is, a font intended by the user.

BEST MODE FOR CARRYING OUT THE INVENTION

Figure 1:
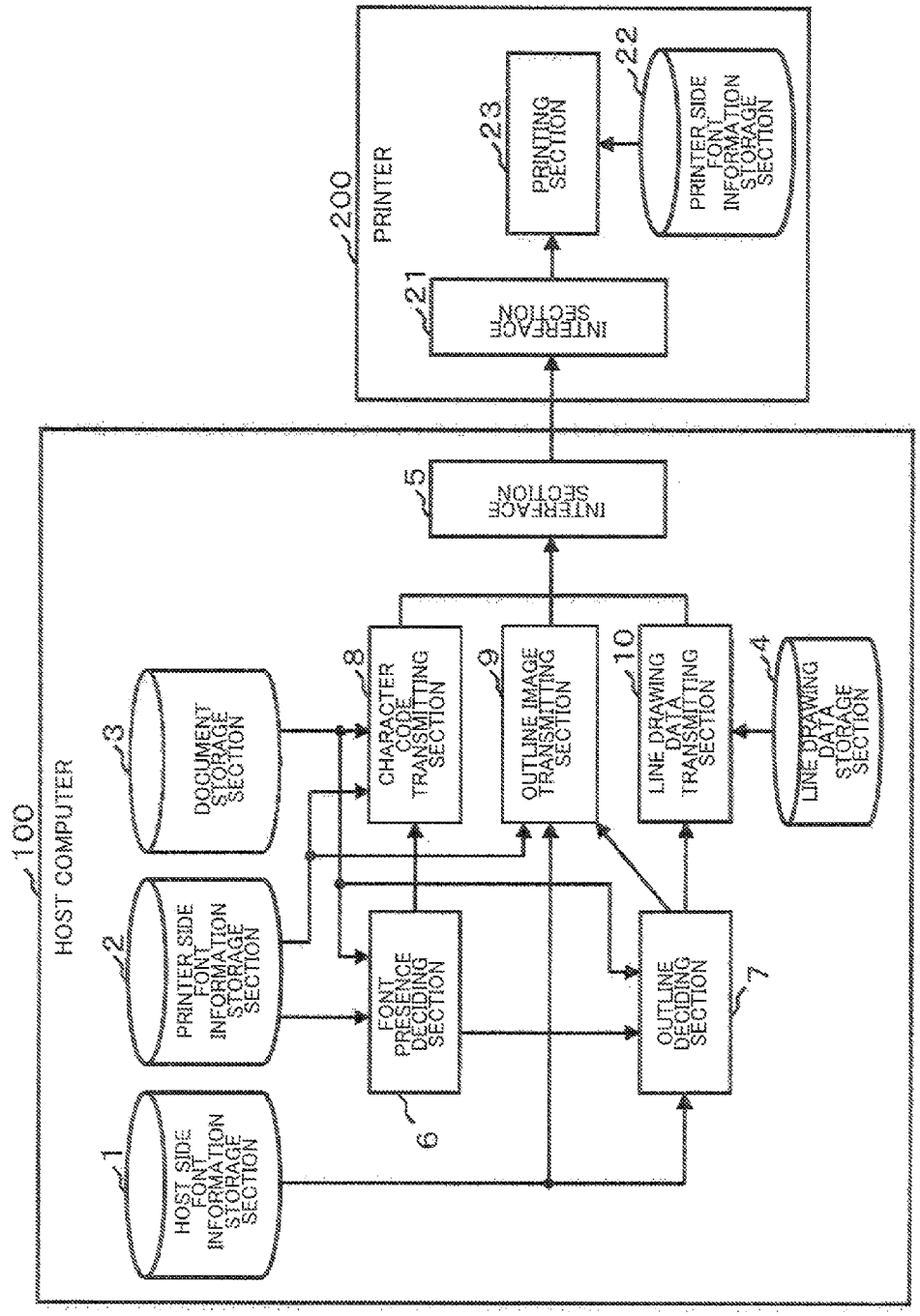
FIG. 1 is a diagram showing an example of a structure of a printing system according to the present embodiment.

An embodiment according to the present embodiment will be described below with reference to the drawings. FIG. 1 is a diagram showing an example of a structure of a printing system according to the present embodiment. As shown in FIG. 1, the printing system according to the present embodiment includes a host computer 100 and a printer 200 which enables bidirectional communication with the host computer 100.

The host computer 100 includes, as a functional structure thereof, a host side font information storage section 1, a printer side font information storage section 2, a document storage section 3, a line drawing data storage section 4, an interface section 5, a font presence deciding section 6, an outline deciding section 7, a character code transmitting section 8, an outline image transmitting section 9 and a line drawing data transmitting section 10. Moreover, the printer 200 includes, as a functional structure thereof, an interface section 21, a printer side font information storage section 22 and a printing section 23.

Respective functions of the font presence deciding section 6, the outline deciding section 7, the character code transmitting section 8, the outline image transmitting section 9 and the line drawing data transmitting section 10 can be constituted by hardware, DSP (Digital Signal Processor) or software. In the case in which the function is constituted by the software, for example, it actually includes a CPU, an RAM, an ROM and the like in a computer and is implanted by an operation of a program stored in a storage medium such as an RAM, an ROM, a hard disk, a semiconductor memory or the like.

The host side font information storage section 1 prestores information about a font included in the host computer 100 (which will be hereinafter referred to as an in-host font). Font information stored in the host side font information storage section 1 includes a font name of the in-host font, font data (entity data of a font) and metrics information. The metrics information is layout information which determines, for each character, a character base line, ascent to be a size from the base line to an upper part of a character, descent to be a size from the base line to a lower part of a character, a character feed amount and the like. The metrics information is stored corresponding to each of the in-host fonts.

The in-host font to be stored in the host side font information storage section 1 is a screen font for displaying a character in a predetermined format on a display screen and is used in preparation of a document through the host computer 100. The in-host font may be a bit map font, an outline font, a vector font or the like. Moreover, various fonts may be mixed and stored in the host side font information storage section 1. Moreover, the in-host font to be stored in the host side font information storage section 1 may be a monospaced font or a proportional font and may be their mixture.

The printer side font information storage section 22 of the printer 200 prestores information about a font included in the printer 200 (which will be hereinafter referred to as an in-printer font). The font information to be stored in the printer side font information storage section 22 includes a font name of the in-printer font, font data (entity data of a font) and metrics information. The metrics information is stored corresponding to each of the in-printer fonts.

The in-printer font to be stored in the printer side font information storage section 22 is a printing font for printing a character in a predetermined format and is used in execution of the printing through the printer 200. The in-printer font may be a bit map font, an outline font, a vector font or the like. Moreover, various fonts may be mixed and stored in the printer side font information storage section 22. Moreover, the in-printer font to be stored in the printer side font information storage section 22 may be a monospaced font or a proportional font and they may be mixed.

The printer side font information storage section 2 of the host computer 100 corresponds to a font information storage section according to the present invention, and prestores information about a font included in the printer 200 (a printing font stored actually in the printer side font information storage section 22 of the printer 200). The font information to be stored in the printer side font information storage section 2 includes a font name of the in-printer font, a glyph image possessed by the in-printer font and metrics information. The metrics information is stored corresponding to each of the in-printer fonts.

The font information to be stored in the printer side font information storage section 2 serves to specify any printing font which is present in the printer 200 and possession of a character format (a glyph image) corresponding to what character (a distinguishable Unicode value including a variant character selector) for each printing font that is present, and is previously acquired from the printer 200. Herein, the font name functions as identification information about the in-printer font and it is essential to store the font name in the printer side font information storage section 2. If the in-printer font can be identified based on the identification information, however, the information does not need to be the font name.

On the other hand, it is not essential to store the metrics information in the printer side font information storage section 2 if all of characters to be printed have equal widths. To the contrary, in the case in which characters having mutually variable widths are output in a proportional font in which character styles are varied depending on an in-host font or an in-printer font, each character width position is important to print each character in an accurate position. In this case, it is preferable that the metrics information should be stored in the printer side font information storage section 2.

The document storage section 3 serves to store document data prepared by the host computer 100. The document data to be stored in the document storage section 3 includes at least each character code of a character string constituting a document (a character string to be printed) and font identification information (a font name) designated for each character in the document. In the present embodiment, it is assumed that Unicode is used as a character code. The Unicode may or may not include a variant character selector (IVS) and includes the variant character selector in the present embodiment.

The line drawing data storage section 4 prestores line drawing data representing a character brushstroke line in a line drawing and the metrics information every character code. The line drawing data is obtained by eliminating a font type design element possessed by a font (shape outline representation such as a thickness of a brushstroke line, a difference in a thickness or a serif) to reduce a data volume, and is constituted in combination of a straight line and a spline curve representing a brushstroke line of a character.

The line drawing data is previously created as a set of paths (a straight line and a spline curve) obtained by acquiring a glyph image of all code points (including a variant character in any of the code points where a variant character is present) to which reference can be made in a Unicode database and thinning them. Then, the line drawing data is stored in the line drawing data storage section 4 in a corresponding form to the code point of the Unicode (the code point where a variant character is present includes selector value information about a variant character).

The interface section 5 of the host computer 100 serves to perform communication with the printer 200. Moreover, the interface section 21 of the printer 200 serves to perform communication with the host computer 100.

The font presence deciding section 6 decides whether a font designated for a character to be printed is present in the printer 200 and the font has a glyph image of the character to be printed. Specifically, the font presence deciding section 6 refers to the font information stored in the printer side font information storage section 2 and confirms whether identification information (a font name) for a font designated for each character in the document data stored in the document storage section 3 and a glyph image are stored in the printer side font information storage section 2, thereby deciding whether a font designated in a document by a user is present in the printer 200 and deciding possession of a glyph image corresponding to what character for each printing font that is present. The font presence deciding section 6 makes the decision for each character included in the document and gives a result of the decision to the outline deciding section 7 and the character code transmitting section 8.

If it is decided by the font presence deciding section 6 that the font which are designated in the document and the glyph image are not present in the printer 200, the outline deciding section 7 decides whether printing based on an outline image can be executed. The outline image is a path of a character form outline (a vector image). The outline deciding section 7 also makes the decision for each character included in the document.

Specifically, the outline deciding section 7 refers to the font information stored in the host side font information storage section 1 and confirms whether a font designated for a character decided so as not to have either an in-printer font or a glyph image by the font presence deciding section 6 has an outline image, thereby deciding whether printing based on the outline image can be executed. Then, a result of the decision is given to the outline image transmitting section 9 and the line drawing data transmitting section 10.

If the font presence deciding section 6 decides that the designated font and the glyph image are present in the printer 200, the character code transmitting section 8 reads a character code representing a character to be printed from the printer side font information storage section 2 and transmits the character code together with the designated font identification information (font name) to the printer 200.

If the font presence deciding section 6 decides that the designated font or the glyph image is not present in the printer 200 and the outline deciding section 7 decides that the printing based on the outline image can be executed, the outline image transmitting section 9 reads an outline image of the designated font from the host side font information storage section 1 and transmits the outline image to the printer 200.

The outline image transmitting section 9 generates printing position information about a character as necessary based on the metrics information stored in the printer side font information storage section 2, and transmits the outline image together with the printing position information to the printer 200. For example, in the case in which an in-printer font is used for only first two characters of "AB" and an outline image is used for a third character of "C" when a character string of "ABC" is to be printed, the outline image transmitting section 9 uses the metrics information stored in the printer side font information storage section 2 to generate printing position information about the character of "C" and transmits the printing position information together with an outline image to the printer 200 in order to accurately obtain a printing start position for the character of "C" (a post-printing position of the characters of "AB").

If the outline deciding section 7 decides that the printing based on the outline image cannot be executed, the line drawing data transmitting section 10 reads line drawing data on a character to be printed from the line drawing data storage section 4 and transmits the line drawing data to the printer 200. The processing of the line drawing data transmitting section 10 is also performed for each character included in the document. Specifically, the line drawing data transmitting section 10 reads the line drawing data stored in the line drawing data storage section 4 corresponding to a character code of the character decided to be disabled for the printing based on the outline image and transmits the line drawing data to the printer 200.

In the same manner as the outline image transmitting section 9, the line drawing data transmitting section 10 also generates printing position information as necessary based on the metrics information stored in the line drawing data storage section 4 and transmits the line drawing data together with the printing position information to the printer 200.

The printing section 23 of the printer 200 executes printing related to each character of a document based on at least one of a character code and a font name which are transmitted by the character code transmitting section 8, an outline image transmitted by the outline image transmitting section 9 and line drawing data transmitted by the line drawing data transmitting section 10.

For example, in the case in which a set of a character code and a font name (hereinafter referred to as a character code set) for all character strings in the document are transmitted by the character code transmitting section 8, the printing section 23 executes printing based on the character code set.

In the case in which the outline image is transmitted for a part of characters in the document by the outline image transmitting section 9, the printing section 23 executes the printing for a part of the characters based on the outline image. In this case, the printing section 23 executes the printing through path drawing based on the outline image.

In the case in which line drawing data for the part of the characters in the document is transmitted by the line drawing data transmitting section 10, furthermore, the printing section 23 executes the printing for the part of characters based on the line drawing data. The printing section 23 determines a thickness of a line in the line drawing data drawing by setting 7% of a character size as a standard based on a character drawing size and a resolution. For example, in the case of an image output of 400 dpi and a font size of 18 points, the number of pixels within a one-character printing range is 18/72*400=100 pixels. Therefore, the path drawing for the line drawing is carried out in a thickness of 7%=a thickness of 7 pixels.

Figure 2:
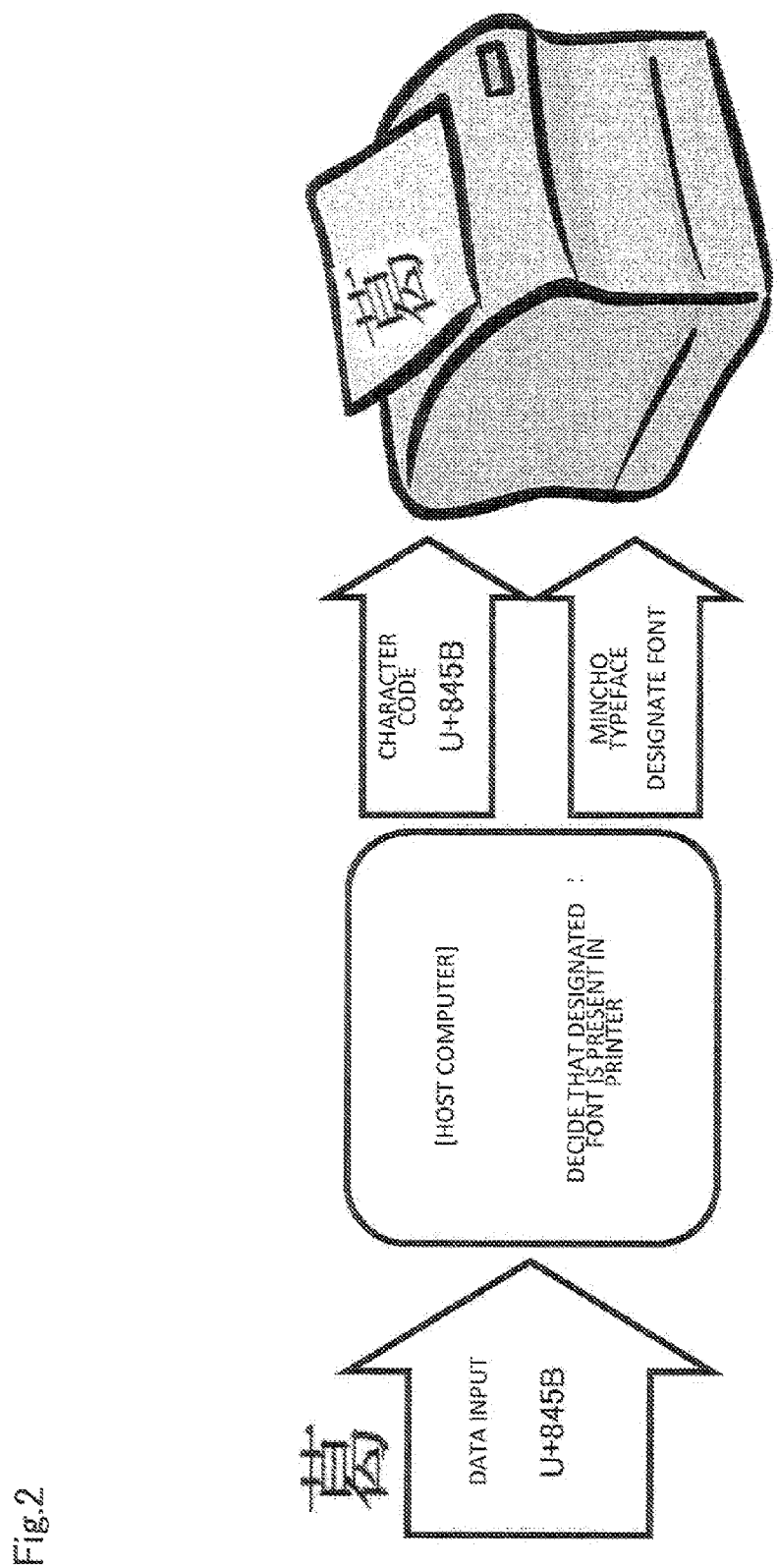
FIG. 2 is a diagram showing a mode of an example of printing to be carried out by the printing system according to the present embodiment.
Figure 3:
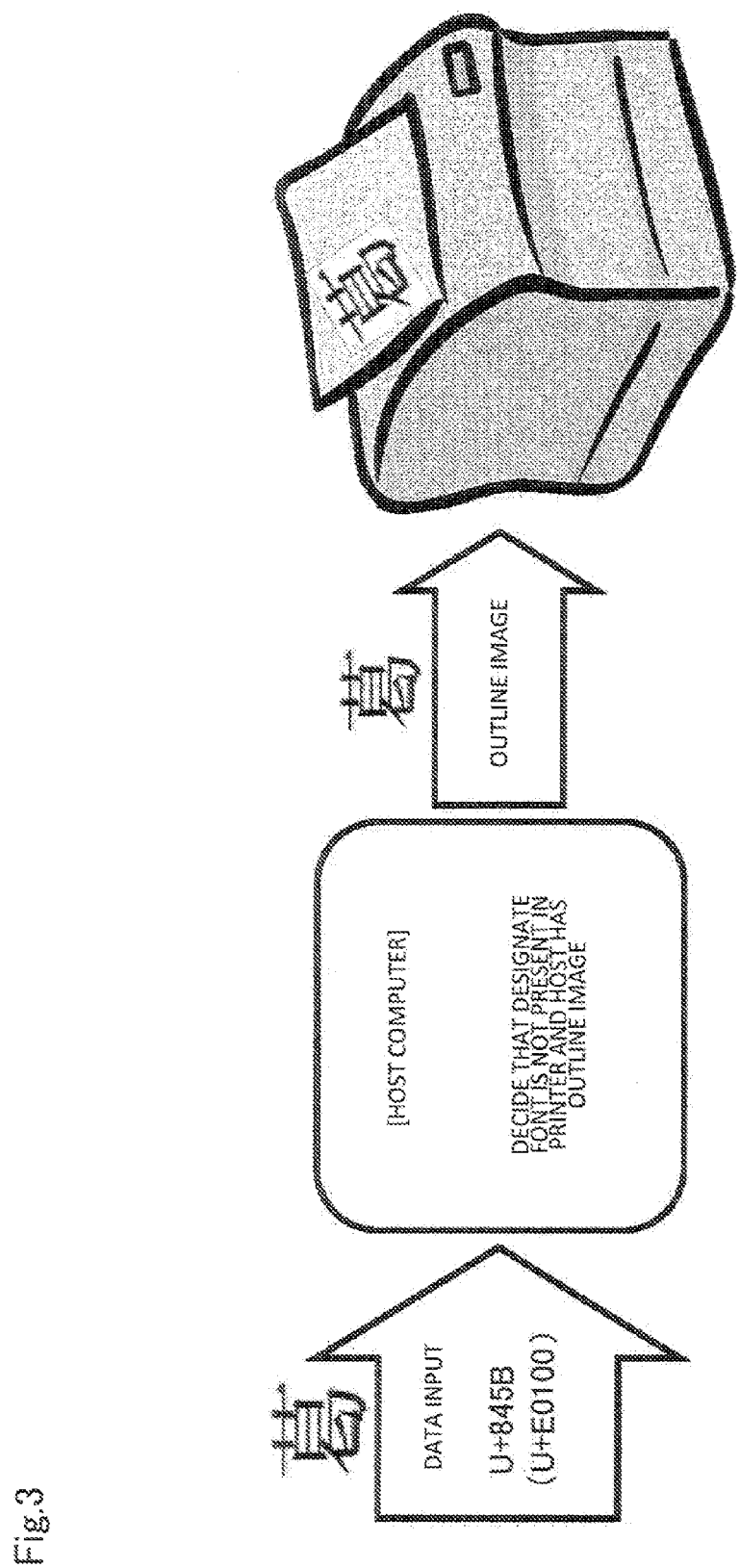
FIG. 3 is a diagram showing a mode of the example of the printing to be carried out by the printing system according to the present embodiment.
Figure 4:
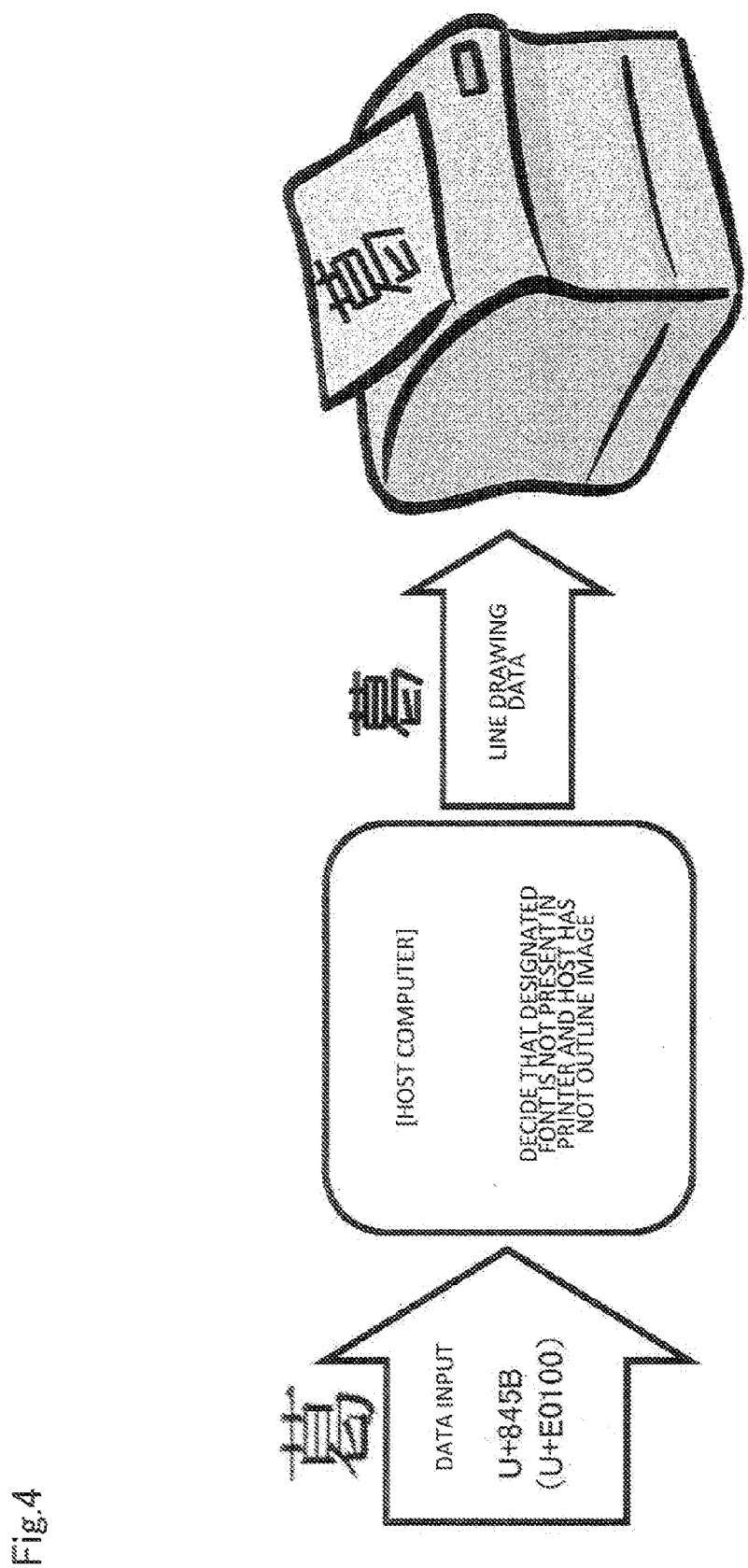
FIG. 4 is a diagram showing a mode of the example of the printing to be carried out by the printing system according to the present embodiment.

FIGS. 2 to 4 are diagrams showing an example of printing through the printing system according to the present embodiment. FIG. 2 is a diagram showing an example of printing in the case in which a font designated for a character to be printed and a glyph image are present in the printer 200. FIG. 2 shows the example in which a kanji of "葛" read as "katsu"

(the combination of the radical "kusa-kanmuri" and kanji"日", a character code=U+845B) is printed. In this case, the host computer 100 transmits, to the printer 200, a character code (U+845B) representing a character to be printed and a font name (for example, Mincho typeface) of the designated font. The printer 200 prints the character of "葛" by using the font data stored in the printer side font information storage section 22 based on the received character code and font name.

FIG. 3 is a diagram showing an example of printing in the case in which the font designated for a character to be printed and the glyph image are not present in the printer 200 and the outline image is present in the host computer 100. FIG. 3 shows the example in which a variant kanji of "葛" (the combination of the radical "kusa-kanmuri" and kanji "日" and "匂", a character code=U+845B, a selector value of the variant character=U+E0100) is printed. In this case, the host computer 100 transmits, to the printer 200, an outline image of a font designated for a character to be printed. The printer 200 prints a variant character of "葛" through path drawing based on the received outline image.

FIG. 4 is a diagram showing an example of printing in the case in which the font designated for a character to be printed or the glyph image is not present in the printer 200 and an outline image is not present in the host computer 100. In the example shown in FIG. 4, the variant character of "葛" is printed. In this case, the host computer 100 transmits, to the printer 200, the line drawing data which is prestored in the line drawing data storage section 4 in relation to a character to be printed. The printer 200 prints the variant character of "葛" based on the received line drawing data.

Figure 5:
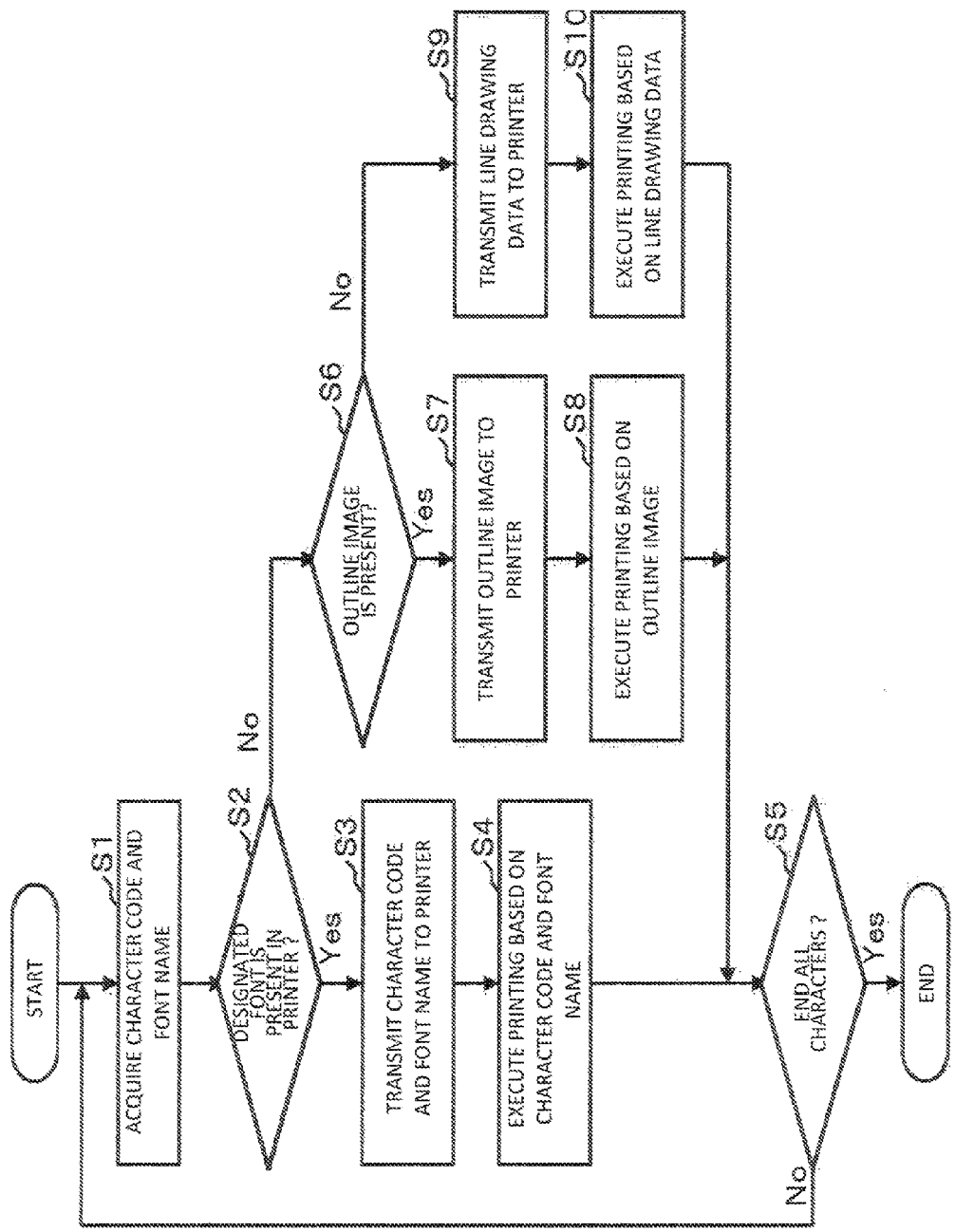
FIG. 5 is a flowchart showing an example of an operation of the printing system according to the present embodiment.

FIG. 5 is a flowchart showing an example of an operation of the printing system according to the present embodiment having the structure described above. The flowchart shown in FIG. 5 starts when the user gives an instruction for executing the printing for the document stored in the document storage section 3.

First of all, the font presence deciding section 6 extracts one of the characters from the document and acquires a character code of the character and a font name representing a font designated for the character (Step S1). By referring to the printer side font information storage section 2, then, the font presence deciding section 6 decides whether a font designated for the character acquired in Step S1 is present in the printer 200 and the font has a glyph image of the character to be printed (Step S2).

If the designated font is present in the printer 200 and has the glyph image of the character to be printed, the character code transmitting section 8 transmits, to the printer 200, the character code and the font name which are acquired in Step S1 (Step S3). The printer 200 prints the character extracted in Step S1 by using the font data stored in the printer side font information storage section 22 based on the character code and the font name which are received from the host computer 100 (Step S4).

Thereafter, the font presence deciding section 6 decides whether the processing for all of the characters in the document are ended (Step S5). If there are still residual characters, the processing return to Step S1. Subsequently, one of the following characters in the documents is extracted and a character code and a font name are acquired, and similarly, it is decided whether a font designated for the character is present in the printer 200 and has a glyph image of the character to be printed (Step S2).

If it is decided that the designated font or the glyph image is not present in the printer 200, the outline deciding section 7 refers to the font information stored in the host side font information storage section 1 and confirms whether the font designated for the character decided so as not to have the font or the glyph image in the printer 200 has an outline image, thereby deciding whether printing based on the outline image can be executed (Step S6).

If the printing based on the outline image can be executed, the outline image transmitting section 9 transmits, to the printer 200, the outline image of the font designated for the character to be printed (Step S7). The printer 200 prints the character extracted in Step S1 by path drawing based on the outline image received from the host computer 100 (Step S8). Thereafter, the processing proceeds to Step S5.

If the outline deciding section 7 decides that the printing based on the outline image cannot be executed in Step S6, the line drawing data transmitting section 10 reads the line drawing data prestored in the line drawing data storage section 4 in relation to the character to be printed and transmits the line drawing data to the printer 200 (Step S9). The printer 200 prints the character extracted in Step S1 based on the line drawing data received from the host computer 100 (Step S10). Then, the processing proceeds to Step S5. If it is decided that the processing related to all of the characters in the document is ended in Step S5, the processing of the flowchart shown in FIG. 5 is ended.

As described above in detail, in the printing system according to the present embodiment, the host computer 100 decides whether a font designated for a character to be printed is present in the printer 200 and whether a glyph image of a character to be printed is present in the font when the font is present. If it is decided that the font and the glyph image are present, a character code representing a character to be printed is transmitted together with a font name of the designated font to the printer 200 so that printing is executed. On the other hand, if it is decided that the designated font or the glyph image is not present in the printer 200 and it is decided that printing based on an outline image can be executed, the outline image of the designated font is transmitted to the printer 200 to execute the printing.

According to the printing system in accordance with the present embodiment having the structure described above, even if the font designated by the host computer 100 or the glyph image is not present in the printer 200, the outline image possessed by the designated font is transmitted to the printer 200 and the printing is executed. Consequently, it is possible to execute the printing in a character format which is nearly equivalent to a font designated through the host computer 100 by a user, that is, a font intended by the user.

In the present embodiment, moreover, if it is decided that the printing based on the outline image cannot be executed, line drawing data of the character to be printed is transmitted to the printer 200 to execute the printing. Even if the font designated by the host computer 100 is not present in the printer 200, consequently, it is possible to reliably prevent garbage characters from occurring.

In the present embodiment, moreover, metrics information about all of an in-host font, an in-printer font and line drawing data are stored in the host computer 100. Also in the case in which a character to be printed based on a character code, a character to be printed based on an outline image and a character to be printed based on line drawing data are mixed in a single document, it is possible to carry out printing by accurately acquiring a printing position of a character string and adjusting a layout to have high quality.

Although the description has been given to the example in which font information about an in-printer font are prestored in the printer side font information storage section 2 of the host computer 100 and it is decided based on the font information whether a designated font is present in the printer 200 in the embodiment, the present invention is not restricted thereto.

For example, when an instruction for executing printing is given in the host computer 100, the font presence deciding section 6 may perform communication with the printer 200, thereby acquiring information about the font present in the printer 200 and deciding whether the designated font is present in the printer 200 based on the acquired font information.

Although the description has been given to the example in which line drawing data is used as an alternative of a printing font and is transmitted from the host computer 100 to the printer 200 and is then printed in the embodiment, moreover, it is also possible to display the line drawing data on the screen of the host computer 100 by using the line drawing data as a screen font.

In addition, the embodiment is only illustrative for concreteness to carry out the present invention and the technical scope of the present invention should not be thereby construed to be restrictive. In other words, the present invention can be carried out in various configurations without departing from the gist or main features thereof.

EXPLANATION OF DESIGNATION 2 printer side font information storage section
4 line drawing data storage section
6 font presence deciding section
7 outline deciding section
8 character code transmitting section
9 outline image transmitting section
10 line drawing data transmitting section
23 printing section

The invention claimed is:

1. A printing system including a host computer and a printer capable of performing bidirectional communication with the host computer,
wherein the host computer includes:
a font presence deciding section for deciding whether a font designated for a character to be printed is present in the printer and has a glyph image of the character to be printed;
a character code transmitting section for transmitting a character code representing the character to be printed together with identification information about the designated font to the printer if the font presence deciding section decides that the designated font and the glyph image are present in the printer; and
an outline image transmitting section for transmitting an outline image of the designated font to the printer if the font presence deciding section decides that the designated font and the glyph image are not present in the printer, and
the printer includes a printing section for executing printing based on at least one of the character code and the identification information about the font which are transmitted by the character code transmitting section, and the outline image transmitted by the outline image transmitting section,
wherein processing of the font presence deciding section, the character code transmitting section and the outline image transmitting section is executed for each character included in a document prepared by the host computer,
wherein the host computer includes an outline deciding section for deciding whether printing based on the outline image can be executed if the font presence deciding section decides that the designated font and the glyph image are not present in the printer; and
a line drawing data transmitting section for transmitting, to the printer, line drawing data representing a brushstroke line of the character to be printed in a line drawing from which an outline representation of the character shape to be a font type design element possessed by a font is eliminated if the outline deciding section decides that the printing based on the outline image cannot be executed,
the outline image transmitting section transmits the outline image of the designated font to the printer if the font presence deciding section decides that the designated font and the glyph image are not present in the printer and the outline deciding section decides that the printing based on the outline image can be executed, and
the printing section of the printer executes printing based on at least one of the character code and the identification information about the font which are transmitted by the character code transmitting section, the outline image transmitted by the outline image transmitting section and the line drawing data transmitted by the line drawing data transmitted section.

2. The printing system according to claim 1, wherein the host computer further includes a line drawing data storage section for prestoring the line drawing data every character code, and
the line drawing data transmitting section reads the line drawing data on the character to be printed from the line drawing data storage section and transmits the line drawing data to the printer if the outline deciding section decides that the printing based on the outline image cannot be executed.

3. The printing system according to claim 1, wherein processing of the font presence deciding section, the character code transmitting section, the outline image transmitting section, the outline deciding section and the line drawing data transmitting section is executed for each character included in a document prepared by the host computer.

4. The printing system according to claim 1, wherein the host computer further includes a font information storage section for prestoring information about a font present in the printer and stores metrics information having a character feed amount determined for each character corresponding to each of the fonts present in the printer, and
the line drawing data transmitting section obtains a printing position of the line drawing data and adjusts a layout based on the metrics information stored in the font information storage section and then transmits the line drawing data.

5. A non-transitory computer program product for use with a computer, the computer program product comprising computer usable medium including a program for printing control to be operated in a host computer in a printing system including the host computer and a printer capable of performing bidirectional communication with the host computer, the program causing the host computer to function as:
font presence deciding means for deciding whether a font designated for a character to be printed is present in the printer and has a glyph image of the character to be printed;
character code transmitting means for transmitting a character code representing the character to be printed together with identification information about the designated font to the printer if the font presence deciding means decides that the designated font and the glyph image are present in the printer; and outline image transmitting means for transmitting an outline image of the designated font to the printer if the font presence deciding means decides that the designated font and the glyph image are not present in the printer, wherein processing of the font presence deciding means, the character code transmitting means and the outline image transmitting means is executed for each character included in a document prepared by the host computer, wherein the host computer includes an outline deciding means for deciding whether printing based on the outline image can be executed if the font presence deciding means decides that the designated font and the glyph image are not present in the printer; and a line drawing data transmitting means for transmitting, to the printer, line drawing data representing a brushstroke line of the character to be printed in a line drawing from which an outline representation of the character shape to be a font type design element possessed by a font is eliminated if the outline deciding means decides that the printing based on the outline image cannot be executed, the outline image transmitting means transmits the outline image of the designated font to the printer if the font presence deciding means decides that the designated font and the glyph image are not present in the printer and the outline deciding means decides that the printing based on the outline image can be executed, and the printing means of the printer executes printing based on at least one of the character code and the identification information about the font which are transmitted by the character code transmitting means, the outline image transmitted by the outline image transmitting means and the line drawing data transmitted by the line drawing data transmitted means.

* * * * *